May 30, 1933.    R. S. CARTER    1,911,490
SPRING SUSPENSION
Filed Nov. 29, 1930
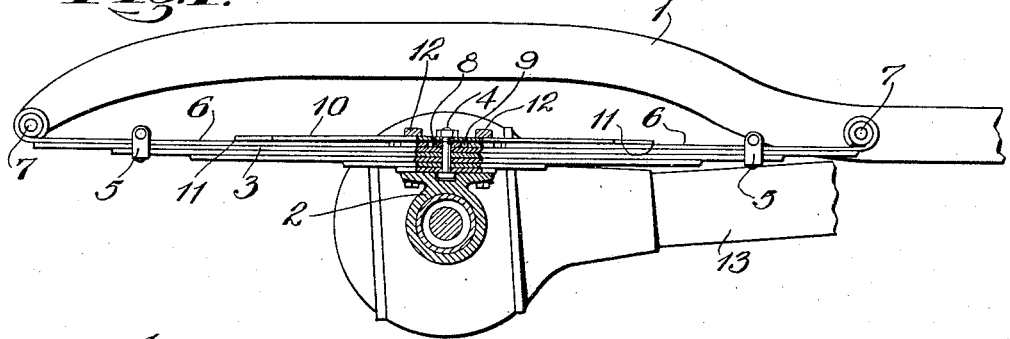
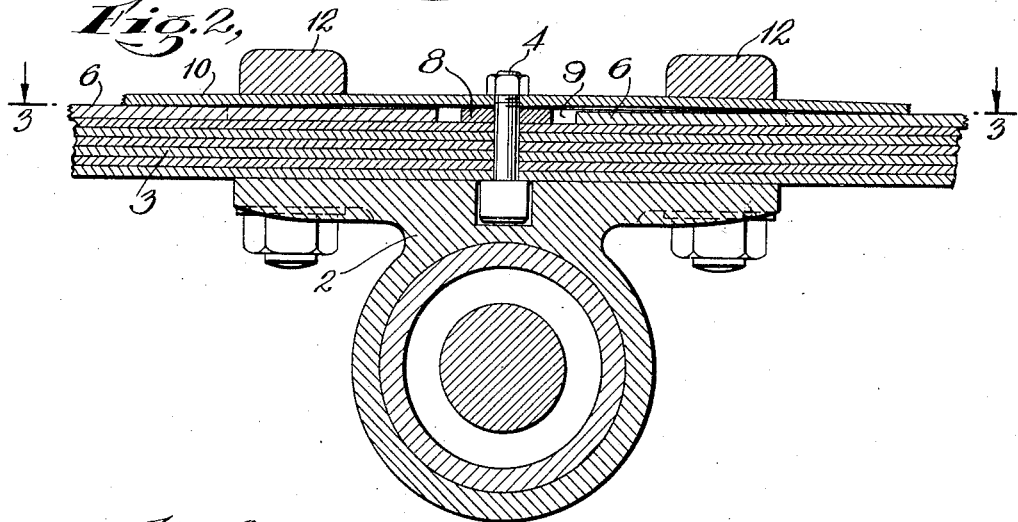
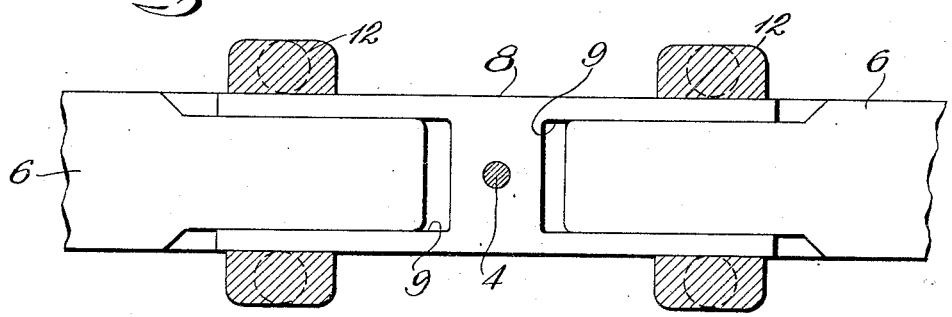

Patented May 30, 1933

1,911,490

UNITED STATES PATENT OFFICE

RUSSELL S. CARTER, OF HEWLETT, NEW YORK

SPRING SUSPENSION

Application filed November 29, 1930. Serial No. 498,926.

The object of the invention is an improved vehicle spring of the kind described in my prior Patent No. 1,475,170 in which is disclosed a multiple-leaf spring embodying sliding means comprising a leaf or leaves adapted to accommodate the relative movement of the sprung and fixed bodies under load and thereby eliminating the customary shackles.

The present invention consists in the provision of an artificial friction member designed to improve the action of the sliding element, in the provision of means facilitating the use of two sliding leaves and also other features herein disclosed.

In the accompanying drawing the invention is applied to the rear suspension of an automobile chassis, Fig. 1 being an elevation showing a part of the chassis frame, the spring and such of the adjacent parts as are necessary to an understanding of the invention, Fig. 2 an enlarged elevation of the spring in longitudinal section, parts being broken away, Fig. 3 a plan of the sliding leaves and a preferred form of guide device, and Fig. 4 a plan of the friction leaf.

The reference 1 indicates the rear end of a chassis frame member and 2 any relatively fixed support for the spring, herein a pad provided upon the rear axle. The spring itself comprises a plurality of leaves 3 of different lengths grouped one on another to provide a thick mid-portion and flexible ends and clamped together by a bolt 4 or otherwise. Clips 5 or any other appropriate means are provided to keep the leaves in alignment.

The elimination of the customary shackles is accomplished by attaching the spring to the frame member by sliding means herein shown as comprising two leaves 6 of less than full length superimposed and adapted to bear on the longest leaf of the group 3. The sliding leaves preferably terminate short of the center of the spring but as herein shown are of such length that their outer ends extend beyond the group and constitute the attachment means by which the spring is attached directly to the frame member, i. e. without the interposition of the usual swinging shackles. This may be accomplished by imbedding them in rubber or in any suitable way, according to the design of the frame member, the ends of leaves 6 here being shown as turned about studs 7.

The reference 8 indicates a guide plate, the purpose of which is to hold the leaves 6 in alignment with the group and to restrict them during sliding to a path paralleling the length of leaves 3. It may be variously designed for this purpose, but preferably comprises an H-shaped plate (Fig. 3) rigidly positioned by the spring bolt 4, as indicated. The plate is preferably of the same width as the spring leaves and accordingly the inner ends of the sliding leaves are reduced in width to slide freely in the slots 9 of the plate.

While the clips 5 may be located to hold the inner ends of the sliding leaves from rising off the leaf next below I preferably provide suitable spring means which not only serve this purpose but also dampen the movement of the sliding leaves, which results in smoother action of the spring as a whole. This means, in its latter function, is designed to urge the sliding leaf or leaves of a spring of this type into abnormal frictional contact with the adjacent leaf of the spring, that is to say, to ensure closer contact between the sliding leaf and its neighbor than would result simply from the weight of the body which the spring supports. It is here indicated as an additional leaf 10 having a reverse set from the other leaves so as to bear on the sliding leaves at or about the points 11. The friction leaf is preferably clamped to the other leaves by the springbolt 4 and in this event, so as to avoid binding, the guide plate is made somewhat thicker than the sliding leaves whereby the latter are free to slide therein while restrained somewhat by the action of the friction leaf.

As shown in Fig. 1 the spring may be clamped to its pad 2 by means of the usual U-bolts 12, which also serve to keep the several leaves in alignment.

In operation it will be apparent that under varying load, the ends of the spring being attached to the frame member at points a fixed distance apart, the leaves 6 will slide relatively toward and from each other guided by plate 8. By providing two such sliding leaves the frame and spring pad or other mounting are free to move toward and from each other in a substantially vertical path instead of on the short radius arc as would be the case were but one sliding leaf employed. Such straight-line movement is of course especially desirable for rear-end automobile suspensions, where the rear axle is held against longitudinal movement relatively to the chassis, as by the torque tube 13. Furthermore, movement of the sliding leaves is beneficially dampened at all times as a result of their being in close, frictional contact with the adjacent leaf surfaces, both above and below.

Having now described my invention, I claim:

1. In combination with a vehicle spring comprising a plurality of leaves of different lengths grouped one on another to provide a thick mid-portion and flexible ends, guiding means located centrally of said group, and two sliding leaves having their outer ends attached directly to a frame member and their inner ends received in and guided by said means.

2. In combination with a vehicle spring comprising a plurality of leaves of different lengths grouped one on another to provide a thick mid-portion and flexible ends, a guide plate located centrally of said group, and two sliding leaves having their outer ends attached directly to a frame member and their inner ends received in and guided by said plate, and means acting to retain said sliding leaves within the guide plate, the latter being thicker than said leaves to permit sliding movement thereof within the plate.

3. A shackle-less vehicle spring comprising a plurality of leaves of different lengths grouped one on another to provide a thick mid-portion and flexible ends, two sliding leaves each adapted to bear on the longest of said group and of such length that each terminates short of the center of the group and its outer end extends beyond the ends of the longest leaf thereof, the said outer ends of said leaves each attached directly to a frame member, means for guiding said sliding leaves against lateral displacement with respect to the group and a friction leaf superimposed on said sliding leaves.

4. In combination with a vehicle spring comprising a plurality of leaves of different lengths grouped one on another to provide a thick mid-portion and flexible ends and having sliding means including a leaf or leaves superimposed thereon and attached directly to a frame member, a guide plate laterally confining said sliding means, a spring bolt clamping together said plate and group of leaves and means superimposed on said sliding leaf or leaves and vertically confining the same.

5. A shackle-less vehicle spring comprising a plurality of leaves of graded lengths, grouped one on another to provide a thick mid-portion and tapered flexible ends, two sliding leaves each adapted to bear on the longest of said group and each of such length that its outer end extends beyond the end of the longest leaf of the group, said outer ends being each attached directly to a common rigid frame member and means for guiding said sliding leaves against vertical and lateral displacement with respect to the group.

6. A shackle-less vehicle spring comprising a plurality of leaves of graded lengths, grouped one on another to provide a thick mid-portion and tapered flexible ends, two sliding leaves each adapted to bear on the longest of said group and each of such length that its outer end extends beyond the end of the longest leaf of the group, said outer ends being each attached directly to a common rigid frame member and means fixed relatively to the group restraining said sliding leaves from vertical and lateral displacement while permitting longitudinal movement thereof relatively to said means.

In testimony whereof, I have signed this specification.

RUSSELL S. CARTER.